United States Patent
Daly et al.

(10) Patent No.: US 8,699,989 B2
(45) Date of Patent: Apr. 15, 2014

(54) SYSTEM AND METHOD FOR THE DEFINITION AND SCOPE OF COMMERCIAL MOBILE ALERTS

(75) Inventors: Brian K. Daly, Seattle, WA (US); DeWayne A. Sennett, Redmond, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 680 days.

(21) Appl. No.: 12/618,222

(22) Filed: Nov. 13, 2009

(65) Prior Publication Data

US 2011/0117873 A1  May 19, 2011

(51) Int. Cl.
*H04M 11/04* (2006.01)

(52) U.S. Cl.
USPC .......... 455/404.1; 455/404.2; 455/567; 455/466; 455/521; 455/414.2; 379/45

(58) Field of Classification Search
USPC .......... 455/404.1, 404, 521, 404.2, 567, 466, 455/458; 379/45
See application file for complete search history.

(56) References Cited

U.S. PATENT DOCUMENTS

| | | | |
|---|---|---|---|
| 6,397,054 B1 * | 5/2002 | Hoirup et al. | 455/404.1 |
| 7,058,385 B2 * | 6/2006 | Lauper | 455/404.1 |
| 7,193,531 B2 * | 3/2007 | Ito et al. | 340/988 |
| 8,026,806 B2 * | 9/2011 | Hasek et al. | 340/539.16 |
| 8,078,210 B2 * | 12/2011 | Fuller et al. | 455/521 |
| 8,078,233 B1 * | 12/2011 | Sennett et al. | 455/567 |
| 8,090,342 B2 * | 1/2012 | Xu et al. | 455/404.1 |
| 8,138,915 B2 * | 3/2012 | Milbar | 340/539.14 |
| 8,532,607 B2 * | 9/2013 | Sennett et al. | 455/404.1 |
| 8,554,169 B2 * | 10/2013 | Daly et al. | 455/404.1 |
| 8,594,613 B2 * | 11/2013 | Daly | 455/404.1 |
| 2005/0030977 A1 * | 2/2005 | Casey et al. | 370/485 |
| 2007/0129053 A1 * | 6/2007 | Phillips et al. | 455/404.1 |
| 2009/0023418 A1 * | 1/2009 | Grevers, Jr. | 455/404.1 |
| 2010/0124898 A1 * | 5/2010 | Qu et al. | 455/404.1 |
| 2010/0311385 A1 * | 12/2010 | Hurwitz | 455/404.1 |

* cited by examiner

*Primary Examiner* — Sharad Rampuria
(74) *Attorney, Agent, or Firm* — Baker & Hostetler LLP

(57) ABSTRACT

An emergency alert system includes an emergency alert gateway configured for receiving an emergency alert message, for categorizing the emergency alert message, and for determining a subscriber base to receive the emergency alert message, a data base in communication with the emergency alert gateway; and an emergency alert server configured to distribute the emergency alert message to the subscriber base. A method of distributing emergency alert messages includes receiving an emergency alert message, determining whether the emergency alert message is one of at least three categories of alert messages, selecting a subscriber base based on the determining step and distributing the emergency alert message to the selected subscriber base.

7 Claims, 6 Drawing Sheets

SYSTEM AND METHOD FOR THE DEFINITION AND SCOPE OF COMMERCIAL MOBILE ALERTS

TECHNICAL FIELD

The technical field generally relates to wireless communications and more specifically relates to emergency alerts delivered through wireless networks.

BACKGROUND

The wireless Emergency Alert System (EAS) is capable of providing messages indicative of a variety of types of alerts. Via the EAS, subscribers thereof can receive messages pertaining to weather conditions, disasters, AMBER (America's Missing: Broadcast Emergency Response) alerts, and/or alerts issued by the Government, for example. The wireless industry has a formed a consensus that wireless emergency alerts "will either be classified as an imminent threat to life or property or as a Presidential level alert". The problem with those classifications is that they have the potential to result in a "cry wolf" syndrome, where subscribers become complacent due to receiving alerts on their mobile devices for non-life or property threatening or "routine" events. In addition, sending alerts for non-life or property threatening events could result in an increase of calls to an operator's customer care, or to public safety agencies. Thus it is imperative to scope wireless emergency alerts to those events that are truly in the "imminent threat" category. If there is a desire to provide further alerts, those further alerts must be clearly distinguished and delineated in order to avoid confusion and possible complacency.

SUMMARY

An emergency alert system includes an emergency alert gateway configured for receiving an emergency alert message, for categorizing the emergency alert message, and for determining a subscriber base to receive the emergency alert message, a data base in communication with the emergency alert gateway; and an emergency alert server configured to distribute the emergency alert message to the subscriber base. The system may also include distribution of alert messages wherein the emergency alert message is one of a Category 1 message, a Category 2 message, and a Category 3 message. The subscriber base is determined by whether the category of the message is a Category 1, Category 2 or Category 3 message. If the emergency alert message is a category 2 message, then a secondary subscriber base is determined from the subscriber base and the emergency alert server distributes the emergency alert message to the secondary subscriber base. Additionally, the subscriber base may be determined based on the categorizing step.

Also included is a method of distributing emergency alert messages, including receiving an emergency alert message, determining whether the emergency alert message is one of at least three categories of alert messages, selecting a subscriber base based on the determining step; and distributing the emergency alert message to the selected subscriber base. The method may also include a determination of categories wherein the at least three categories include Category 1, Category 2 and Category 3 alert messages. If the emergency alert message is a Category 2 message, then a secondary subscriber base may be selected from the subscriber base and the emergency alert is distributed to the secondary subscriber base.

BRIEF DESCRIPTION OF THE DRAWINGS

The following description is better understood when read in conjunction with the appended drawings.

DESCRIPTION OF ILLUSTRATIVE EMBODIMENTS

Figure 1:
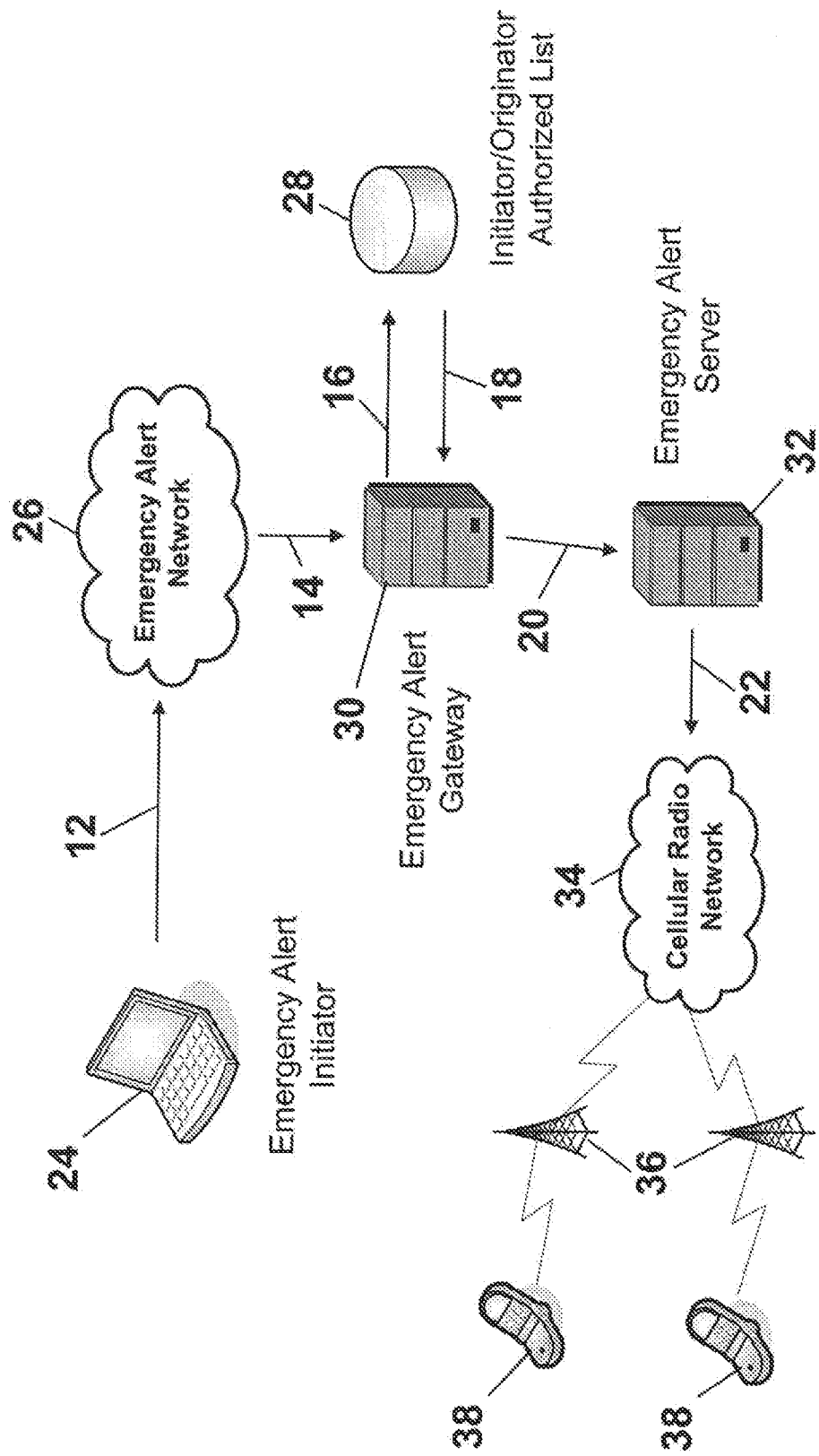
FIG. 1 is a flow diagram of an example process and system for generating and distributing a predetermined emergency alert message.

The system and method of the present invention defines three classes of wireless emergency alerts. Those are defined as: (1) Category 1, or Presidential-level (2) Category 2, or imminent threat to life and property and (3) Category 3, all others. It is preferable that mobile operators that elect to transmit emergency mobile alerts support at least the first two categories, namely presidential-level alerts and imminent threat to life and property alerts. An operator may choose to deliver alerts beyond this scope as a commercial service; however the scope and definition proposed is the minimum requirement for an operator who elects to deliver wireless alerts under the WARN Act.

Presidential-level Alerts

The first class of alerts is the Presidential-level alerts, or defined herein as Category 1 alerts. As specified in the WARN Act, any alert issued by the President shall be delivered by an operator that elects to transmit emergency alerts {Sec. 602(b)(2)(E)} {Sec. 603(c)(5)}. There shall be no subscriber opt-out capability for this class of message. The CAP protocol preferably clearly identifies how a Presidential-level alert is issued so that a clear indication can be delivered to the wireless operator, and ultimately to the wireless mobile device.

Imminent Threat to Life and Property

The second class is the "imminent threat" class, defined herein as Category 2 alerts. Any commercial mobile service licensee electing to transmit emergency alerts may offer subscribers the capability of preventing the subscriber's device from receiving such alerts, or classes of such alerts, other than an alert issued by the President {Sec. 602(b)(2)(E)} {Sec. 603(c)(5)}. Thus, this class of service may support subscriber opt-out capability.

Contained in this class of alerts are those alerts defined by the following:

Severity

Alerts for which the CAP "Severity" field indicates "Extreme" where there is extraordinary threat to life or property, or "Severe" where there is significant threat to life or property Urgency
   Alerts for which the CAP "Urgency" field is "Immediate" where responsive action SHOULD be taken immediately, or "Expected" where responsive action SHOULD be taken soon (within next hour)
Certainty
   Alerts for which the CAP "Certainty" field indicates "Observed" where the event is determined to have occurred or to be ongoing, or "Likely" with a probability of occurrence >~50%
Additionally, the following NOAA Weather Radio All Hazards Specific Area Message Encoding (NWR SAME) event codes would fall into this class:
   NWR Weather-Related Events
      Blizzard Warning
      Coastal Flood Warning
      Dust Storm Warning
      Flash Flood Warning
      Flood Warning
      High Wind Warning
      Hurricane Warning
      Severe Thunderstorm Warning
      Special Marine Warning
      Tornado Warning
      Tropical Storm Warning
      Tsunami Warning
      Winter Storm Warning
   NWR-SAME Optional State and Local Codes
      Avalanche Warning
      Civil Danger Warning
      Earthquake Warning
      Fire Warning
      Hazardous Materials Warning
      Law Enforcement Warning
      Nuclear Power Plant Warning
      Radiological Hazard Warning
      Shelter In Place Warning
      Volcano Warning
The above are all "Warnings" defined as those events that alone pose a significant threat to public safety and/or property, probability of occurrence and location is high, and the onset time is relatively short.

The following sub-categories of this class may be employed to provide subscribers to opt-out of one or more of the sub-categories, while still receiving other alerts from other sub-categories. While the subscribers may choose to opt-out of some categories, although it is possible to do, it is preferable that subscribers not be able to opt-out of any of the events under those subcategories. For example, the following three sub-categories may be classified according to weather, environmental, or safety as follows:
   Weather—contains all weather-related warnings
      Blizzard Warning
      Dust Storm Warning
      Flash Flood Warning
      Flood Warning
      High Wind Warning
      Hurricane Warning
      Severe Thunderstorm Warning
      Tornado Warning
      Tropical Storm Warning
      Winter Storm Warning
   Environmental—events related to geological or other environmental events
      Coastal Flood Warning
      Fire Warning
      Special Marine Warning
      Avalanche Warning
      Earthquake Warning
      Volcano Warning
   Safety—events as a result of man-made actions
      Civil Danger Warning
      Hazardous Materials Warning
      Law Enforcement Warning
      Nuclear Power Plant Warning
      Radiological Hazard Warning
      Shelter In Place Warning
   Special Case: Child Abduction Emergency
   The Child Abduction Emergency falls under the "event that by itself would not kill or injure or do property damage but indirectly may cause other things to happen that result in a hazard" classification in the NWR-SAME definition. Under the above definition, Child Abduction Emergency would not qualify under the "wireless emergency alert" definition. However, in accordance with the present invention, child abduction emergency alerts would be also be classified as Category 2 alerts. It will be appreciated by those skilled in the art that this is different from the Amber Alert program today, which is a subscriber opt-in program.
   All Others
   The third class is the "All Others" category, defined herein as Category 3 alerts. This class defines those events that are less likely to have an imminent impact to life or property, or there is minimal to no impact to life or property. These classes do not fall into the scope of the WARN Act "wireless emergency alert", but an operator may optionally choose to deliver these alerts as a commercial service to their subscribers. The Category 3 alerts could be sent to the Emergency Alert Server from the Emergency Alert Gateway over the interface [20]. The Emergency Alert Gateway would send these "All Others" category of messages to the Emergency Alert Server either based upon pre-defined configuration or profile information in the Emergency Alert Gateway or based upon instructions received from the Emergency Alert Server with the connection is established between the Emergency Alert Gateway and the Emergency Alert Server.
   Contained in this class of alerts are those alerts defined by the following:
   Severity
      Alerts for which the CAP "Severity" field indicates "Moderate" with a possible threat to life or property, or "Minor" where there is minimal threat to life or property
      Alerts for the CAP "Severity" of "Unknown" (severity unknown) should also be included in this class
   Urgency
      Alerts for which the CAP "Urgency" field is "Future" indicating responsive action SHOULD be taken in the near future, or "Past" indicating responsive action is no longer required
      Alerts for the CAP "Urgency" of "Unknown" (urgency not known) should also be included in this class
   Certainty
      Alerts for which the CAP "Certainty" field is "Possible" where the event is possible but not likely (p<=~50%), or "Unlikely", that is not expected to occur (p~0)
      Alerts for which the CAP "Certainty" field is "Unknown"—Certainty unknown should also be included in this class
In addition, NWR SAME Event Codes classified as follows fall into this category:
   Watch where the event meets the classification of a warning, but either the onset time, probability of occurrence or location is uncertain Emergency where an event that by itself would not kill or injure or do property damage but indirectly may cause other things to happen that result in a hazard. Example, a major power or telephone loss in a large city alone is not a direct hazard but disruption to other critical services could create a variety of conditions that could directly threaten public safety Statement where a message containing follow up information to a warning, watch, or emergency With reference to FIG. 1, there is shown a flow diagram of an example process and system for generating and distributing a predetermined emergency alert message. At step 12, an emergency alert message is provided to the emergency alert network 26 by an emergency alert initiator 24. In an example embodiment, the emergency alert network 26 is a network configured to accommodate Emergency Alert System (EAS) messages. The emergency alert initiator 24 can be any appropriate emergency alert initiator. For example, an emergency alert initiator 24 can be a government official, a member of a police department, an organization such as the National Weather Service, or the like. Thus the emergency alert initiator 24 could be any of thousands of emergency alert initiators located throughout the United States and Canada.

When the emergency alert initiator 24 receives notification of an existing or pending emergency, the emergency alert initiator 24 generates an emergency alert message formatted in conformance with a protocol for transmission to the emergency alert network 26. The transmission of the emergency alert message, at step 12, can be via a wired interface, a wireless interface, or a combination thereof. The protocol can comprise any appropriate protocol. In an example embodiment, the emergency alert message provided at step 12 is formatted in accordance with the common alerting protocol (CAP). The common alerting protocol is a general format for exchanging all-hazard emergency alerts and public warnings over various wireless networks. A CAP alert message (an alert message formatted in accordance with the common alerting protocol), comprises segments, or fields, indicative of various characteristics of emergency event. For example, the CAP comprises fields indicative of the sender of the emergency alert message, the type of event, the expiration of the event, the urgency of the event, the severity of the event, the certainty of the event, and the intended audience of the event.

At step 14, the emergency alert message is provided to a wireless emergency alert gateway 30. The transmission of the emergency alert message, at step 14, can be via a wired interface, a wireless interface, or a combination thereof. The emergency alert gateway 30 can comprise any appropriate processor, server, or the like. Upon receipt of the emergency alert message (at step 14), the emergency alert gateway 30 analyzes the received emergency alert message to generate, or select, a predetermined emergency alert message and to determine if the initiator/originator of the emergency alert message is an authorized emergency alert initiator/originator.

Figure 2:
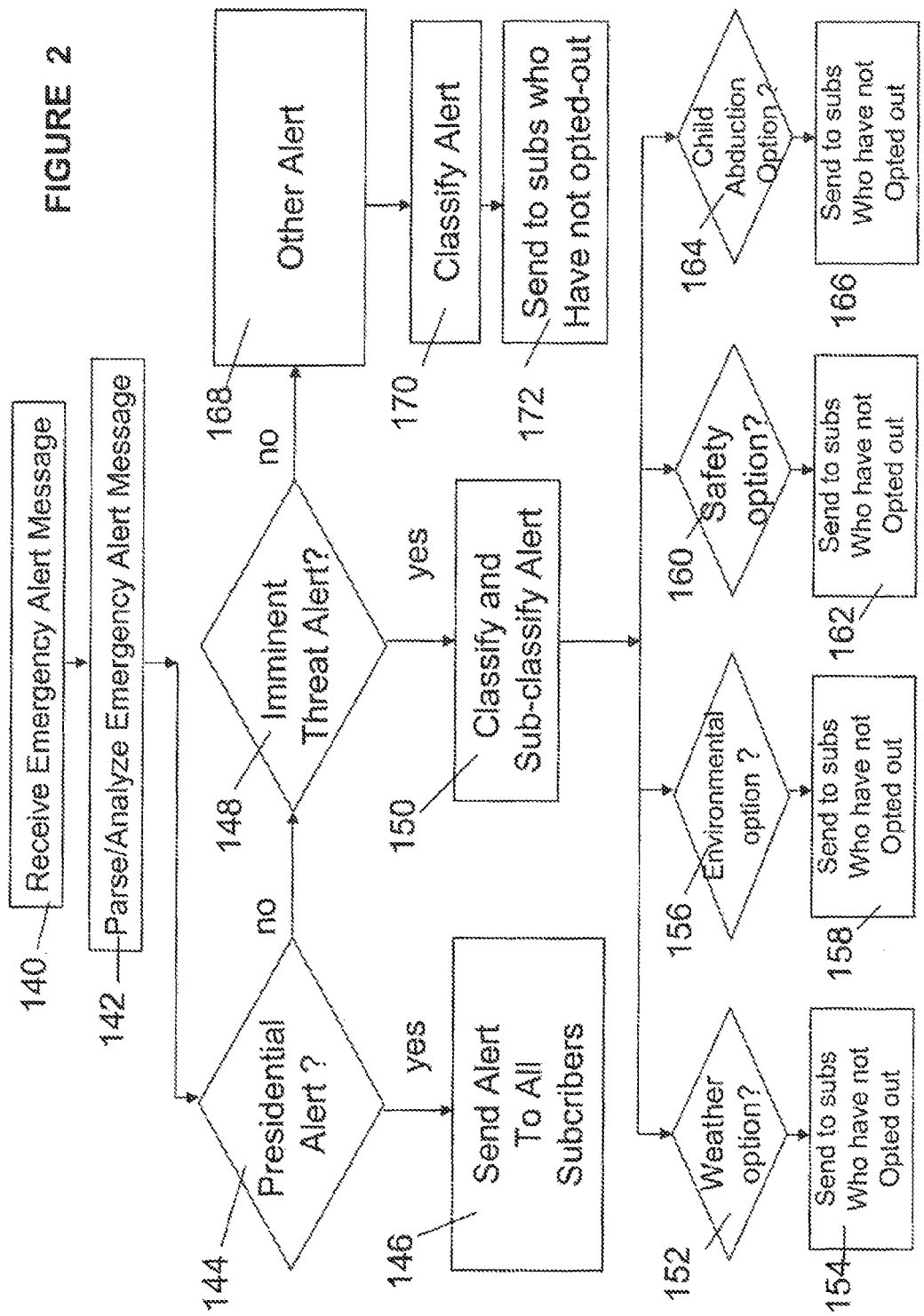
FIG. 2 is a flow diagram of an example process for analyzing an emergency alert message in accordance with the scope and definitions of the present invention.

With reference to FIG. 2, there is shown a process flow for the classification and delivery of emergency alert messages in accordance with the foregoing definitions. At step 140, the emergency alert message is received by the emergency alert gateway 30 in FIG. 1. At step 142, the emergency alert message is parsed and analyzed in accordance with the definitions. At step 144, the analysis determines whether the message is a Presidential alert. If yes, the alert message is sent to all subscribers without regard to opt-in or opt-out preferences at step 146.

At step 144, if the analysis shows that the message is not a Presidential-alert, the determination is made whether it is an alert that includes an imminent threat to life and/or property at step 148. If yes, then the alert is classified and further subclassified as such at step 150. If the determination is that it is a weather alert at step 150, then a check is made at step 152 for the subscribers that have either opted-in or not opted out to receive the message. At step 154, the alert is sent to those subscribers who have either opted-in to receive imminent weather alerts or alternatively have not opted-out to receiving such weather alerts. If the determination is that it is an environmental alert at step 150, then a check is made at step 156 for the subscribers that have either opted-in or not opted out to receive the message. At step 158, the alert is sent to those subscribers who have either opted-in to receive imminent environmental alerts or alternatively have not opted-out to receiving such environmental alerts. If the determination is that it is a safety alert at step 150, then a check is made at step 160 for the subscribers that have either opted-in or not opted out to receive the message. At step 162, the alert is sent to those subscribers who have either opted-in to receive imminent safety alerts or alternatively have not opted-out to receiving such safety alerts. Finally, if the determination is that it is a child-abduction alert at step 150, then a check is made at step 164 for the subscribers that have either opted-in or not opted out to receive the message. At step 166, the alert is sent to those subscribers who have either opted-in to receive child abduction alerts or alternatively have not opted-out to receiving such safety alerts.

If at step 148 it is determined that the alert message is not a Category 2 alert message, then the alert message will be characterized as an other, or Category 3, alert at step 168. At step 170, that alert is classified and then sent to those subscribers that have either opted-in for receiving other alert messages or have not opted-out for receiving such alert messages. Similar to the case with the Category 2 imminent threat alerts, the Category 3 alert messages may be further subclassified and the subscribers that elect to receive Category 3 alert messages may opt-in or opt-out to the various subcategories as desired.

Referring again to FIG. 1, upon receipt of the emergency alert message at step 14, the emergency alert gateway 30 processes the received emergency alert message as described with respect to the process depicted in FIG. 2. In an example embodiment, at step 16, the emergency alert gateway 30 accesses a database 28 to determine if the initiator/originator is authorized. The database 28 can comprise any appropriate storage. In an example embodiment the database 28 comprises a list of authorized initiators/originators. At step 18, an indication is provided to the emergency alert gateway 30 as to whether the initiator/originator is authorized. If the initiator/originator is an authorized initiator/originator, a predetermined emergency alert message comprising optional free-form text or characters, is provided to the emergency alert server 32 at step 20. Thus, if the initiator/originator is an authorized initiator/originator and free-form text or characters accompany the emergency alert message provided at step 14, the free-form text or characters are provided as the predetermined emergency alert message at step 20. If the initiator/originator is an authorized initiator/originator, and no free-form text or characters accompany the emergency alert message provided at step 14, the selected or generated default predetermined emergency alert message is provided at step 20. If, at step 18, an indication is provided to the emergency alert gateway 30 that the initiator/originator is not an authorized initiator/originator, the selected or generated (e.g., as described with respect to the process depicted in FIG. 2) predetermined emergency alert message is provided at step 20.

Thus, if it is determined that the initiator/originator of the emergency alert message is not authorized to deviate from the format of the predetermined emergency alert message, the predetermined emergency alert message is provided at step 20. If it is determined that the initiator/originator of the emergency alert message is authorized to deviate from the format of the predetermined emergency alert message, the predetermined emergency alert message, formatted in accordance with the authorized initiator/originator format, is provided at step 20.

The emergency alert server 32, upon receiving a predetermined emergency alert message, determines the appropriate mobile devices 38 to receive the predetermined emergency alert message. At step 22, the emergency alert server 32 provides the predetermined emergency alert message to the appropriate mobile devices 38 via a cellular radio network 34 and transmitters 36.

Figure 3:
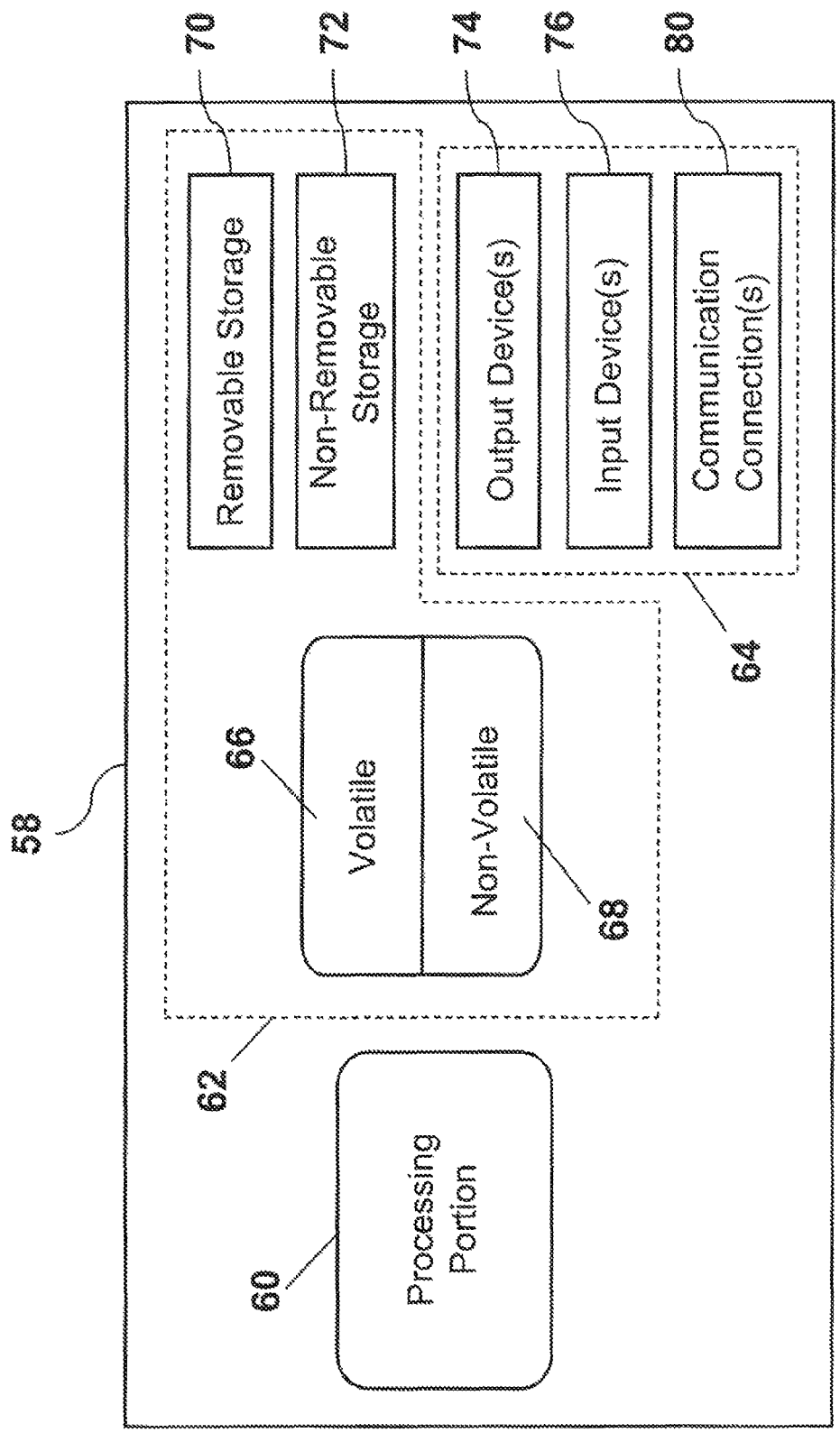
FIG. 3 is a block diagram of an example processor for generating and/or selecting and distributing a predetermined emergency alert message.

The mobile devices 38 are representative of any appropriate type of device that can receive emergency alert messages. Example mobile devices include any type of wireless receiver or transceiver device with broadcast reception capabilities (e.g., cell phone, pager, PDA, PC, specialized broadcast receiving device, first responder Mobile Data Terminal (MDT), FM/AM radio, NOAA weather radio, Land Mobile Radio (LMR), satellite radio receiver, satellite phone, and television). Example devices can comprise any appropriate mobile device, such as, for example, a portable device, a variety of computing devices including (a) a portable media player, e.g., a portable music player, such as an MP3 player, a Walkman, etc., (b) a portable computing device, such as a laptop, a personal digital assistant ("PDA"), a portable phone, such as a cell phone or the like, a smart phone, a Session Initiation Protocol (SIP) phone, a video phone, a portable email device, a thin client, a portable gaming device, etc., (c) consumer electronic devices, such as TVs, DVD players, set top boxes, monitors, displays, etc., (d) a public computing device, such as a kiosk, an in-store music sampling device, an automated teller machine (ATM), a cash register, etc., (e) a navigation device whether portable or installed in-vehicle and/or (f) a non-conventional computing device, such as a kitchen appliance, a motor vehicle control (e.g., steering wheel), etc., or a combination thereof FIG. 3 is a block diagram of an example processor 58 for generating and/or selecting and distributing a predetermined emergency alert message. In an example configuration, the processor 58 comprises the emergency alert gateway 30, the emergency alert server 32, the database 28, or a combination thereof. It is emphasized that the block diagram depicted in FIG. 3 is exemplary and not intended to imply a specific implementation. Thus, the processor 58 can be implemented in a single processor or multiple processors. Multiple processors can be distributed or centrally located. Multiple processors can communicate wirelessly, via hard wire, or a combination thereof.

The processor 58 comprises a processing portion 60, a memory portion 62, and an input/output portion 64. The processing portion 60, memory portion 62, and input/output portion 64 are coupled together (coupling not shown in FIG. 3) to allow communications therebetween. The input/output portion 64 is capable of providing and/or receiving components utilized to generate/select and distribute a predetermined emergency alert message as described above. For example, as described above, the input/output portion 64 is capable of providing/receiving an emergency alert message from an emergency alert network, a request to a database for determining if an initiator/originator is authorized, an indication as to whether an initiator/originator is authorized, a predetermined emergency alert message with or without free form text or characters, or a combination thereof. The processing portion 60 is capable of parsing and analyzing a received emergency alert message, generating a predetermined emergency alert message, selecting a predetermined emergency alert message, or a combination thereof, as described above.

The processor 58 can be implemented as a client processor and/or a server processor. In a basic configuration, the processor 58 can include at least one processing portion 60 and memory portion 62. The memory portion 62 can store any information utilized in conjunction with generating/selecting and distributing a predetermined emergency alert message. For example, as described above, the memory portion is capable of storing the list of a predetermined emergency alert messages, a list of authorized initiators/originators, or a combination thereof. Depending upon the exact configuration and type of processor, the memory portion 62 can be volatile (such as RAM) 66, non-volatile (such as ROM, flash memory, etc.) 68, or a combination thereof. The processor 58 can have additional features/functionality. For example, the processor 58 can include additional storage (removable storage 70 and/or non-removable storage 72) including, but not limited to, magnetic or optical disks, tape, flash, smart cards or a combination thereof. Computer storage media, such as memory portion 62, 70, 72, 66, and 68, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 58. Any such computer storage media can be part of the processor 58.

The processor 58 can also contain communications connection(s) 80 that allow the processor 58 to communicate with other devices, for example. Communications connection(s) 80 is an example of communication media. Communication media typically embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media. The processor 58 also can have input device(s) 76 such as keyboard, mouse, pen, voice input device, touch input device, etc. Output device(s) 74 such as a display, speakers, printer, etc. also can be included.

The following description sets forth some exemplary telephony radio networks and non-limiting operating environments in which predetermined emergency alert messages can be implemented. The below-described operating environments should be considered non-exhaustive, however, and thus the below-described network architectures merely show how predetermined emergency alert messages can be incorporated into existing network structures and architectures. It can be appreciated, however, that predetermined emergency alert messages can be incorporated into existing and/or future alternative architectures for communication networks as well.

The global system for mobile communication ("GSM") is one of the most widely utilized wireless access systems in today's fast growing communication environment. The GSM provides circuit-switched data services to subscribers, such as mobile telephone or computer users. The General Packet Radio Service ("GPRS"), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System ("UMTS"), Frequency Division Duplexing ("FDD") and Time Division Duplexing ("TDD"), High Speed Packet Data Access ("HSPDA"), cdma2000 1x Evolution Data Optimized ("EVDO"), Code Division Multiple Access-2000 ("cdma2000"), Time Division Synchronous Code Division Multiple Access ("TD-SCDMA"), Wideband Code Division Multiple Access ("WCDMA"), Enhanced Data GSM Environment ("EDGE"), International Mobile Telecommunications-2000 ("IMT-2000"), Digital Enhanced Cordless Telecommunications ("DECT"), etc., as well as to other network services that become available in time. In this regard, the techniques of EAS channel assignment can be applied independently of the method for data transport, and do not depend on any particular network architecture, or underlying protocols.

Figure 4:
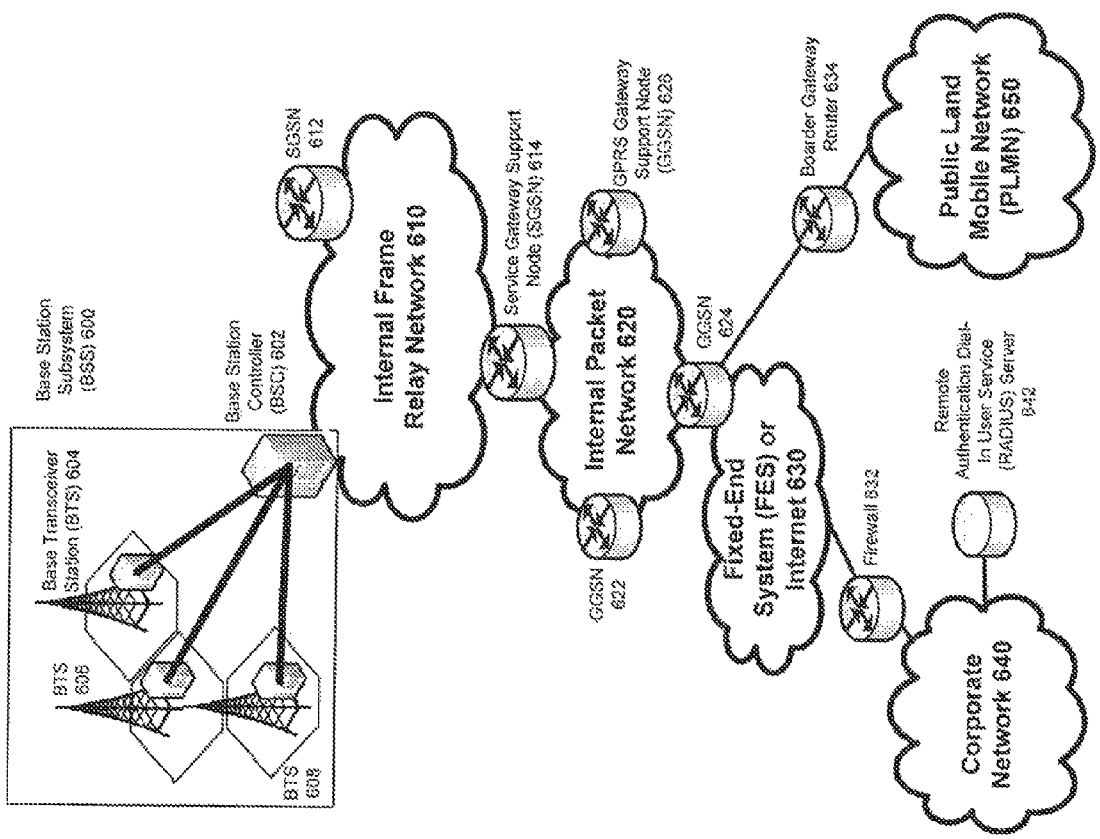
FIG. 4 depicts an overall block diagram of an exemplary packet-based mobile cellular network environment, such as a GPRS network, in which predetermined emergency alert messages can be practiced.

FIG. 4 depicts an overall block diagram of an exemplary packet-based mobile cellular network environment, such as a GPRS network, in which the system for implementing predetermined emergency alert messages can be practiced. In an example configuration, the cellular radio network 34 and towers 36 are encompassed by the network environment depicted in FIG. 4. In such an environment, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices (e.g., mobile device 12) become connected to the wireless network. In exemplary fashion, the packet traffic originating from user devices (e.g., user device 60) is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via border gateway router 634. The Remote Authentication Dial-In User Service ("RADIUS") server 642 may be used for caller authentication when a user of a mobile cellular device calls corporate network 640.

Generally, there can be four different cell sizes in a GSM network, referred to as macro, micro, pico, and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. On the other hand, umbrella cells are used to cover shadowed regions of smaller cells and fill in gaps in coverage between those cells.

Figure 5:
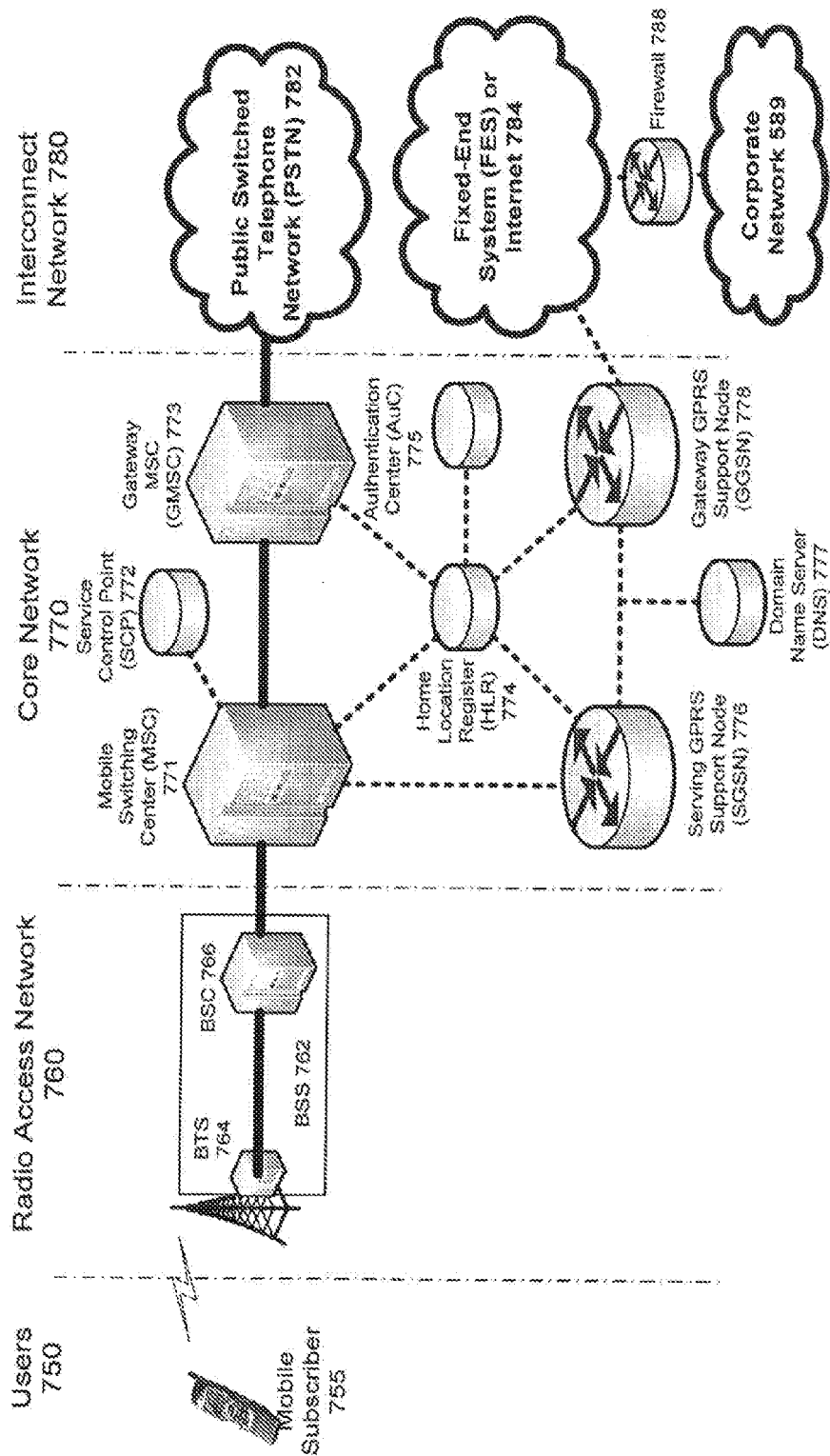
FIG. 5 illustrates an architecture of a typical GPRS network as segmented into four groups.

FIG. 5 illustrates an architecture of a typical GPRS network as segmented into four groups: users 750, radio access network 760, core network 770, and interconnect network 780. In an example configuration the emergency alert network 110, and the wireless broadcast network 116 are encompassed by the radio access network 760, core network 770, and interconnect network 780. Users 750 comprise a plurality of end users (though only mobile subscriber 755 is shown in FIG. 5). In an example embodiment, the device depicted as mobile subscriber 755 comprises mobile device 12. Radio access network 760 comprises a plurality of base station subsystems such as BSSs 762, which include BTSs 764 and BSCs 766. Core network 770 comprises a host of various network elements. As illustrated here, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 5, interconnect network 780 comprises Public Switched Telephone Network ("PSTN") 782, Fixed-End System ("FES") or Internet 784, firewall 788, and Corporate Network 789.

A mobile switching center can be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as the mobile device 12, used by an end user of the mobile cellular service. When a mobile subscriber turns on his or her mobile device, the mobile device goes through an attach process by which the mobile device attaches to an SGSN of the GPRS network. In FIG. 5, when mobile subscriber 755 initiates the attach process by turning on the network capabilities of the mobile device, an attach request is sent by mobile subscriber 755 to SGSN 776. The SGSN 776 queries another SGSN, to which mobile subscriber 755 was attached before, for the identity of mobile subscriber 755. Upon receiving the identity of mobile subscriber 755 from the other SGSN, SGSN 776 requests more information from mobile subscriber 755. This information is used to authenticate mobile subscriber 755 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 755 was attached before, to cancel the location process for mobile subscriber 755. HLR 774 then notifies SGSN 776 that the location update has been performed. At this time, SGSN 776 sends an Attach Accept message to mobile subscriber 755, which in turn sends an Attach Complete message to SGSN 776.

After attaching itself with the network, mobile subscriber 755 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 755. The mobile subscriber 755 uses an algorithm to send the user identification (ID) and password to SGSN 776. The SGSN 776 uses the same algorithm and compares the result. If a match occurs, SGSN 776 authenticates mobile subscriber 755.

Next, the mobile subscriber 755 establishes a user session with the destination network, corporate network 789, by going through a Packet Data Protocol ("PDP") activation process. Briefly, in the process, mobile subscriber 755 requests access to the Access Point Name ("APN"), for example, UPS.com (e.g., which can be corporate network 789 in FIG. 5) and SGSN 776 receives the activation request from mobile subscriber 755. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 755.

Once activated, data packets of the call made by mobile subscriber 755 can then go through radio access network 760, core network 770, and interconnect network 780, in a particular fixed-end system or Internet 784 and firewall 788, to reach corporate network 789.

Thus, network elements that can invoke the functionality of predetermined emergency alert messages can include but are not limited to Gateway GPRS Support Node tables, Fixed End System router tables, firewall systems, VPN tunnels, and any number of other network elements as required by the particular digital network.

Figure 6:
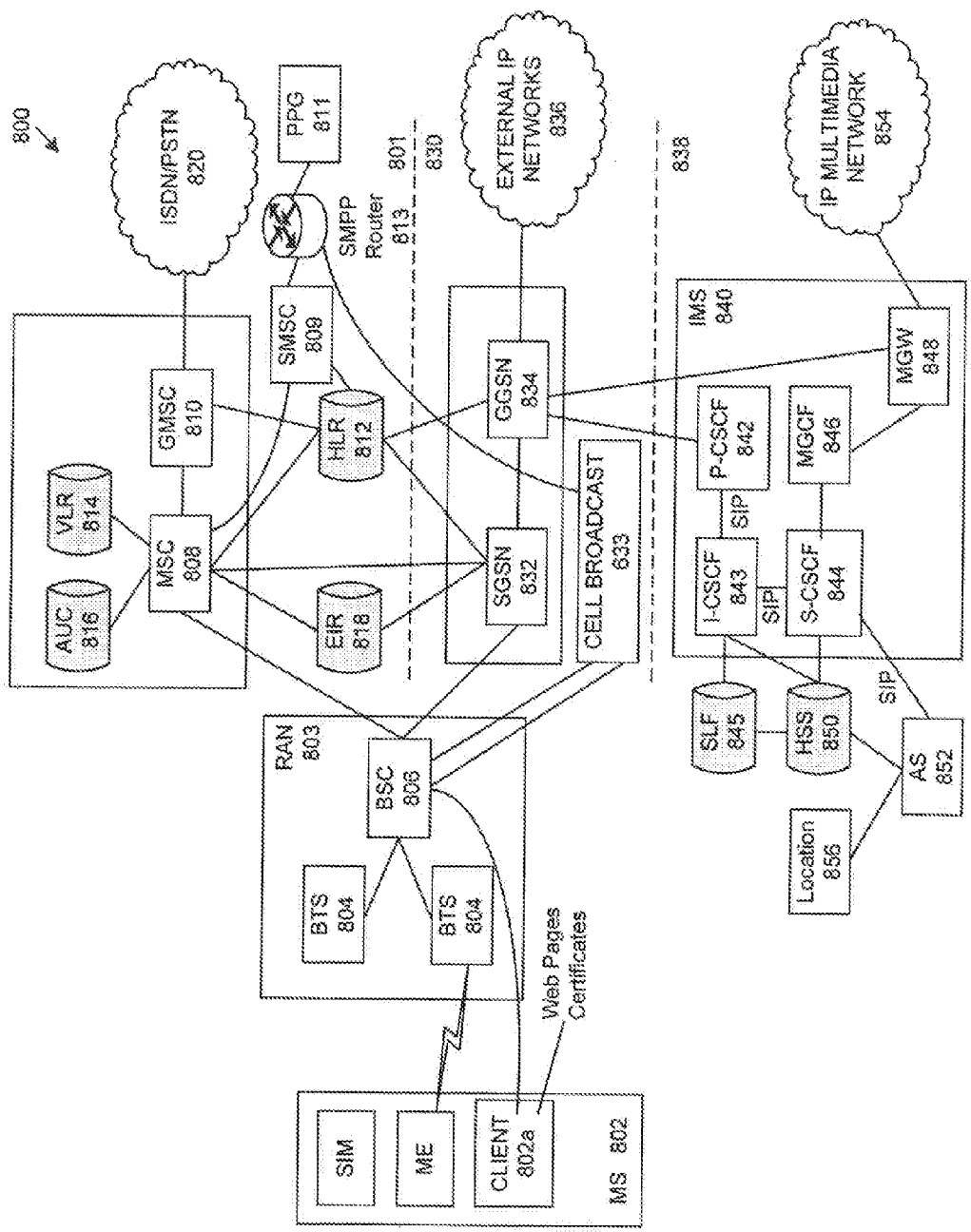
FIG. 6 illustrates an example alternate block diagram of an exemplary GSM/GPRS/IP multimedia network architecture in which predetermined emergency alert messages can be incorporated.

FIG. 6 illustrates another exemplary block diagram view of a GSM/GPRS/IP multimedia network architecture 800 in which predetermined emergency alert messages can be incorporated. As illustrated, architecture 800 of FIG. 6 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer (e.g., mobile device 12) that is used by mobile subscribers, with a Subscriber identity Module (SIM). The SIM includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (i.e., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 833 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel In a NOM3 network, a MS can monitor pages for a circuit switched network while received data and vise versa.

The IP multimedia network 838 was introduced with 3GPP Release 5, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

While example embodiments of predetermined emergency alert messages have been described in connection with various computing devices, the underlying concepts can be applied to any computing device or system capable of implementing predetermined emergency alert messages. The various techniques described herein can be implemented in connection with hardware or software or, where appropriate, with a combination of both. Thus, the methods and apparatus for generating, selecting, and/or implementing predetermined emergency alert messages, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing predetermined emergency alert messages. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

While the present invention has been described in connection with the various embodiments of the various figures, it is to be understood that other similar embodiments can be used or modifications and additions can be made to the described embodiment for performing the same function without deviating therefrom. For example, one skilled in the art will recognize that the definitions and scopes of mobile alerts as described in the present application may apply to any environment, whether wired or wireless, and may be applied to any number of such devices connected via a communications network and interacting across the network. Therefore, the method and system of defining mobile alerts should not be limited to any single embodiment, but rather should be construed in breadth and scope in accordance with the appended claims.

What is claimed:

1. An emergency alert gateway comprising:
   a processor; and
   memory coupled to the processor, the memory having stored thereon executable instructions that when executed by the processor cause the processor to effectuate operations comprising
      receiving, from an emergency alert initiator via an emergency alert network, an emergency alert message;
      determining that the emergency alert initiator is an authorized emergency alert initiator via access to an initiator/originator authorized list database;
      categorizing the emergency alert message as one of:
         a category 1 message indicative of a message issued by a president of the United States;
         a category 2 message indicative of an imminent threat to at least one of life or property; or
         a category 3 message indicative of:
            other than a category 1 message; and
            other than a category 2 message;
      one of selecting a predetermined emergency alert message or generating a predetermined emergency alert message based on an analysis of the emergency alert message;
      based on a resulting category of categorizing the emergency alert message, determining a subscriber base to receive the predetermined emergency alert message; and
      providing, via an emergency alert server and a cellular radio network, the predetermined emergency alert message, wherein an intended recipient of the provided emergency alert message is the determined subscriber base.

2. The emergency alert gateway of claim 1 wherein the subscriber base is determined by whether the message is a category 1 message, a category 2 message, or a category 3 message Category 1 alert, Category 2 alert, or a Category 3 alert.

3. The emergency alert gateway of claim 1 wherein if the emergency alert message is a category 2 message, a secondary subscriber base is determined from the subscriber base and the emergency alert server distributes the emergency alert message to the secondary subscriber base.

4. A method comprising:
   receiving, from an emergency alert initiator via an emergency alert network, an emergency alert message;
   determining, via access to an initiator/originator authorized list database, that the emergency alert initiator is an authorized emergency alert initiator;
   determining whether the emergency alert message comprises one of:
      a category 1 message indicative of a message issued by a president of the United States;
      a category 2 message indicative of an imminent threat to at least one of life or property; or
      a category 3 message indicative of:
         other than a category 1 message; and
         other than a category 2 message;
   selecting a subscriber base based on the a determined category;
   one of selecting a predetermined emergency alert message or generating a predetermined emergency alert message, based on an analysis of the emergency alert message; and
   distributing, via an emergency alert server and a cellular radio network, the predetermined emergency alert message to the selected subscriber base.

5. The method of claim 4 wherein if the emergency alert message is a category 2 message, a secondary subscriber base is selected from the subscriber base and the emergency alert is distributed to the secondary subscriber base.

6. A tangible computer-readable storage medium that is not a propagating signal, the tangible computer-readable storage medium comprising executable instructions that when executed by a processor cause the processor to effectuate operations comprising:
   receiving, from an emergency alert initiator via an emergency alert network, an emergency alert message;
   determining, via access to an initiator/originator authorized list database, that the emergency alert initiator is an authorized emergency alert initiator;
   categorizing the emergency alert message as one of:
      a category 1 message indicative of a message issued by a president of the United States;
      a category 2 message indicative of an imminent threat to at least one of life or property; or
      a category 3 message indicative of:
         other than a category 1 message; and
         other than a category 2 message; and
   one of selecting a predetermined emergency alert message or generating a predetermined emergency alert message based on an analysis of the emergency alert message;
   based on a resulting category of categorizing the emergency alert message, determining a subscriber base to receive the predetermined emergency alert message; and
   providing, via an emergency alert server and a cellular radio network, the predetermined emergency alert message, wherein an intended recipient of the provided predetermined emergency alert message is the determined subscriber base.

7. The tangible computer-readable storage medium of claim 6 wherein if the emergency alert message is a category 2 message, a secondary subscriber base is determined from the subscriber base and the emergency alert server distributes the emergency alert message to the secondary subscriber base.

* * * * *